(12) United States Patent
Bollea et al.

(10) Patent No.: US 8,891,386 B2
(45) Date of Patent: Nov. 18, 2014

(54) METHOD OF TRANSMITTING DATA, CORRESPONDING SYSTEMS AND COMPUTER PROGRAM PRODUCT THEREFOR

(75) Inventors: Loris Bollea, Turin (IT); Bruno Melis, Turin (IT); Roberto Rossi, Turin (IT); Alfredo Ruscitto, Turin (IT); Paolo Semenzato, Rome (IT)

(73) Assignee: Telecom Italia S.p.A., Milan (IT)

( * ) Notice: Subject to any disclaimer, the term of this patent is extended or adjusted under 35 U.S.C. 154(b) by 344 days.

(21) Appl. No.: 13/002,218

(22) PCT Filed: Jun. 30, 2008

(86) PCT No.: PCT/EP2008/005320
§ 371 (c)(1),
(2), (4) Date: Dec. 30, 2010

(87) PCT Pub. No.: WO2010/000275
PCT Pub. Date: Jan. 7, 2010

(65) Prior Publication Data
US 2011/0149780 A1  Jun. 23, 2011

(51) Int. Cl.
*H04L 1/00* (2006.01)
*H04B 7/06* (2006.01)

(52) U.S. Cl.
CPC ............ *H04B 7/0682* (2013.01); *H04B 7/0619* (2013.01); *H04B 7/0617* (2013.01)
USPC ........... 370/252; 370/235; 370/328; 370/316; 370/351; 370/395.4; 455/69; 455/101; 455/522

(58) Field of Classification Search
USPC .............. 370/235, 252, 328, 316, 351, 395.4; 455/69, 101, 522
See application file for complete search history.

(56) References Cited

U.S. PATENT DOCUMENTS 6,741,207 B1 * 5/2004 Allison et al. ................ 342/371
7,768,983 B2 * 8/2010 Nylander et al. ............. 370/338
(Continued)

FOREIGN PATENT DOCUMENTS

| WO | 02/19565 A2 | 3/2002 |
|---|---|---|
| WO | 2004/019515 A1 | 3/2004 |
| WO | 2005/062496 A1 | 7/2005 |
| WO | 2006/037364 A1 | 4/2006 |
| WO | 2008/006932 A1 | 1/2008 |

OTHER PUBLICATIONS

International Search Report dtd Jun. 12, 2009, PCT/EP2008/005320.
(Continued)

*Primary Examiner* — Xavier Szewai Wong
*Assistant Examiner* — Natali N Pascual Peguero
(74) *Attorney, Agent, or Firm* — Banner & Witcoff, Ltd.

(57) ABSTRACT

A method of transmitting signals from a base station towards user terminals in a cellular communication system. The method includes generating diversity signals, wherein at least one of the diversity signals is subjected to a selectively variable RF phase shift. Specifically, a set of radio link quality indicators is determined at the base station, wherein each radio link quality indicator is representative of the quality of the radio link between the base station and a respective one of the user terminals. The set of radio link quality indicators is used to generate an aggregated radio quality indicator, which in turn is used to selectively vary the variable RF phase shift. For example, the phase shift may be selected, which optimizes the aggregated radio quality indicator.

14 Claims, 2 Drawing Sheets

(56) References Cited

U.S. PATENT DOCUMENTS

| | | | |
|---|---|---|---|
| 2005/0037718 A1* | 2/2005 | Kim et al. | 455/101 |
| 2007/0109986 A1* | 5/2007 | Kwak et al. | 370/316 |
| 2008/0316950 A1* | 12/2008 | Damnjanovic | 370/311 |
| 2009/0274104 A1* | 11/2009 | Addy | 370/329 |

OTHER PUBLICATIONS

R.T. Derryberry et al. "Transmit Diversity in 3G CDMA systems", IEEE Communications Magazine, vol. 40, No. 4, pp. 68-75, Apr. 2002.

* cited by examiner

METHOD OF TRANSMITTING DATA, CORRESPONDING SYSTEMS AND COMPUTER PROGRAM PRODUCT THEREFOR

CROSS REFERENCE TO RELATED APPLICATIONS:

This is a U.S. National Phase Application under 35 U.S.C. §371 of International Application No. PCT/EP2008/005320, filed Jun. 30, 2008, which was published Under PCT Article 21(2), the entire contents of which are incorporated herein by reference.

FIELD OF THE INVENTION

This disclosure relates to communication technology.
Specifically, this disclosure concerns transmit antenna diversity techniques.

DESCRIPTION OF THE RELATED ART

High Speed Downlink Packet Access (HSDPA) was standardized in 2002, as a part of Third Generation Partnership Project (3GPP) Release 5 specifications, with the purpose of improving downlink spectral efficiency for packet data transmission.

Basically, HSDPA introduces a new common High Speed Downlink Shared Channel (HS-DSCH), which is shared by all the users in a particular sector. In addition, HSDPA introduces certain mechanisms that enable high speed packet data transmission at the physical layer such as e.g. a short Transmission Time Interval (TTI) of 2 ms, Adaptive Modulation and Coding (AMC), fast retransmission based on hybrid Automatic Repeat request (H-ARQ) techniques and a centralized scheduler located in the Node B (i.e. the base station).

HSDPA coverage is available today in many countries mainly by means of macro-sites located outdoor. The service usage statistics show that mobile broadband services will be increasingly accessed in indoor environments where signal penetration loss may result in quality and throughput degradation. In the case of an indoor user served by an outdoor base station, both the terminal and the base station try to compensate the signal attenuation by increasing the power levels. However, higher power levels may result in increased interference, decreased capacity and shorter terminal battery life.

In order to improve indoor coverage, mobile operators are considering the utilization of small base stations, also known as "femtocells", located at the user premises. A femtocell—known also as an Access Point Base Station—is a small cellular base station, usually intended to support a small number of mobile terminal in a business or home environments. A femtocell may be connected e.g. via DSL or a physical channel to a provider network. Service coverage may thus be extended to indoor environments which would otherwise be difficult or impossible to cover. The femtocell has a typical base station functionality, but with a simpler structure. Several architectures have been devised for the integration of femtocells within High Speed Packet Access (HSPA) networks.

FIG. 1 shows a possible scenario where a set of User Equipments (UE) are connected to a femtocell 10, which integrates also part of the Radio Network Controller (RNC) functionalities. Specifically, the femtocell 10 may comprise a communication module 14, such as an Universal Mobile Telecommunications System (UMTS) and High Speed Packet Access (HSPA) transceiver, which communicates with the user terminals UE over an antenna 30. For this purpose, the UMTS/HSDPA transceiver 14 may integrate the physical layer (Layer 1), the Radio Link Control (RLC)/Medium Access Control (MAC) layer (Layer 2) and the Radio Resource Control (RRC) layer (Layer 3) of the protocol stack. The femtocell 10 may then be connected to the HSPA mobile network of the operator or the internet N. For example, the femtocell may comprise for this purpose an Asymmetric Digital Subscriber Line (ADSL) modem 12.

A femtocell with integrated RNC functionalities is often designated "HSPA Access Point" (HSPA AP). The tasks of the RNC integrated in the femtocell are significantly simpler than those of a traditional RNC. For instance, given the constrained environment of a femtocell the support for mobility is simpler compared to a traditional RNC. Moreover, the integration of the RNC functionalities within the femtocell provides significant benefits in terms of scalability of the architecture. In fact, the number of femtocells connected to a traditional RNC could be too high to permit support by a conventional RNC.

HSPA throughput performance in an indoor environment is influenced by the channel attenuation that ultimately depends on the user distance from the femtocell and on the presence of obstacles (e.g. walls, furniture, doors) between the femtocell and the User Equipment (UE). Taking into account that the maximum radiofrequency (RF) transmit power of the femtocell is limited by safety regulations (for example a typical value is 15 dBm), the coverage range is limited to a few meters. The users located at the cell edge and without Line Of Sight (LOS) propagation conditions may then experience average throughput values that are well under the peak throughput of the HSPA system.

One possible way of improving the throughput provided by the HSPA AP to users experiencing bad channel conditions are transmission antenna diversity techniques, based on the utilization of two or more transmission antennas that introduce additional radio paths and thereby increase the available diversity level. Exploiting spatial diversity in systems with multiple antennas at the transmitter may require that the signal should be pre-processed or pre-coded prior to transmission. In fact, a system with N transmission antennas, where each antenna transmits the same signal with a power equal to P/N, may provide the same performance of a single antenna system with transmission power P. Then, in order to exploit spatial diversity, some kind of pre-processing or pre-coding of the transmitted signals is required.

In case of HSPA systems, two transmit diversity techniques have been standardized by 3GPP regulatory bodies and are described e.g. in R. T. Derryberry et al. "Transmit Diversity in 3G CDMA systems", IEEE Communications Magazine, Vol. 40, No. 4, pages 68-75, April 2002. Both techniques operate at baseband level and thus can be applied independently to the different users connected to the AP.

The first technique, designated Space Time Transmit Diversity (STTD), is an open loop technique with no feedback from the user equipment. Typically, a STTD encoder receives at the input two consecutive modulation symbols $s_1$ and $s_2$ that should be transmitted e.g. on the HS-DSCH channel. The STTD encoder provides at a first output the same symbol sequence $s_1$ and $s_2$, while at a second output the sequence $-s_2^*$ and $s_1^*$ is provided, wherein the mathematical operator ( )* denotes the complex conjugation. The two outputs of the STTD encoder feed then two antenna branches.

In case of a HSDPA system, the two symbols $s_1$ and $s_2$ are first subject to STTD encoding, spread with an Orthogonal Variable Spreading Factor (OVSF) code of length SF=16, scrambled, converted from digital to analog domain (D/A)

and finally up-converted from baseband to radiofrequency. The two RF signals are finally subject to power amplification by means of two separate power amplifiers (PA) and then radiated by the two antennas.

The symbols $s_1$ and $s_2$ can be separated at the UE receiver with simple linear operations, making the STTD very easy to be implemented in a mobile terminal.

The second transmit diversity technique standardized by 3GPP is a closed loop technique designated Closed Loop Transmit Diversity (CLTD). Specifically, the bit stream of a given user to be transmitted on the HS-DSCH channel is first subject to channel coding, interleaving and modulation in a CLTD transmitter structure. The modulated symbol stream $(s_1, s_2, \ldots, s_k)$ is then weighed with antenna specific weight factors $w_1$, $w_2$ and feeds the two antenna branches. Clearly different UEs require different weight factors depending on their instantaneous channel conditions. The weight factor $w_1$ is a constant scalar. The weight factor $w_2$ (actually corresponding to a phase adjustment) is determined by the UE, and signaled to the base station using the Feedback Information (FBI) field of the uplink Dedicated Physical Control Channel (DPCCH). Each UE calculates its individual weight factors $w_1$ and $w_2$ that provide a coherent combination at the UE antenna of the two signals transmitted by the HSPA access point and thus maximize the signal to interference plus noise ratio (SINR).

In addition to transmit diversity techniques that operate at baseband level, diversity techniques also exists that operate at radiofrequency (RF) on the composite signal of the base station. The main advantage of RF techniques lies in that they do not need to be standardized, and can be implemented as an add-on module to existing equipments.

An exemplary transmit diversity technique operating at radiofrequency is described in WO 06/037364. This technique is based on the introduction of a variable delay on the signal transmitted by the second antenna. In case of a system with N=2 transmission antennas, the signal is split in two parts at the output of the RF amplifier with power $P_1$ and $P_1$ respectively (in the typical configuration $P_1=P_2$). The first signal is transmitted from the main antenna, while a time variant delay t(t) is applied to the second signal. The variable delay introduces an artificial fast fading on the signal received by the UE, and thus improves the coding and interleaving performance in slow fading channels. The Variable Delay Transmit Diversity introduces an additional time diversity that improves the performance in slow time varying channels.

OBJECT AND SUMMARY OF THE INVENTION

Several studies have shown that performance improvement provided by the STTD technique in case of the HS-DSCH channel is quite limited. The inventors have noted that a reason for this may lie in that the HS-DSCH channel is already equipped with several diversity mechanisms: time diversity due to the H-ARQ technique, multi-user diversity due to the advanced scheduling techniques exploited by the HSDPA technology and frequency diversity deriving from the wideband transmission; as a consequence, the spatial diversity of the STTD technique provides only limited throughput improvements in case of the HS-DSCH shared channel.

The inventors have also noted that, differently from STTD, CLTD provides a performance improvement also in conjunction with the H-ARQ technique. In fact, the improvement of the CLTD technique is mainly related to the combining gain deriving from the coherent combination of the two transmitted signals at the UE antenna. However, both STTD and CLTD require two RF transmitters and two power amplifiers, and this may have a significant impact on the Bill Of Material (BOM) of the femtocell.

Finally, the inventors have noted that the main improvement of the Variable Delay Transmit Diversity technique operating at RF occurs for e.g. Release '99 channels of the UMTS system that use a long Transmission Time Interval (TTI) of 10, 20 or 40 ms and do not employ H-ARQ techniques. In case of a HSPA system, the Variable Delay Transmit Diversity would thus expectedly provide limited performance improvements due to the short TTI length of the HS-DSCH channel and due to the utilization of the H-ARQ that already introduces a certain amount of time diversity on the transmitted signal.

The object of the invention is thus to provide a satisfactory response to the need of a transmit diversity technique that combines the low cost and reduced complexity of the techniques operating at RF level and, at the same time, provides a performance improvement comparable to e.g. the CLTD technique.

According to the present invention, that object is achieved by means of a method having the features set forth in the claims that follow. The invention also relates to corresponding systems as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of the arrangement described herein relates to a novel transmit diversity mechanism, which is particularly suitable for use in femtocells, such as HSPA AP.

Certain embodiments of the arrangement described herein introduce transmit diversity at radiofrequency level and thus are independent from the considered communication standard. Specifically, certain embodiments of the arrangement described herein may be used to provide a transmit diversity for transmitters comprising only a single transmission chain, i.e. comprising one RF transmitter and one power amplifier, with a corresponding small impact on the BOM of the femtocell.

In an embodiment, transmit diversity is achieved by separating the RF signal coming from the power amplifier of a transmitter into a plurality of RF signals, which are subjected to respective phase shift prior to transmission via a plurality of respective transmission antennas.

In an embodiment, the phase shifts are selected as a function of an aggregated radio quality indicator, which depends on the radio link quality of the various connected user equipments.

In an embodiment, the phase shifts are selected in order to maximize the aggregate performance of the AP.

In an embodiment, the phase shifts are selected in order to guarantee a minimum QoS to the user that experiences the worst channel conditions.

Certain embodiments of the arrangement described herein may also be used in Multiple-Input Multiple-Output (MIMO) systems by providing for each transmitter an independent set of diversity transmission antennas.

BRIEF DESCRIPTION OF THE ANNEXED DRAWINGS

The invention will now be described, by way of example only, with reference to the enclosed figures of drawing, wherein.

Figure 3:
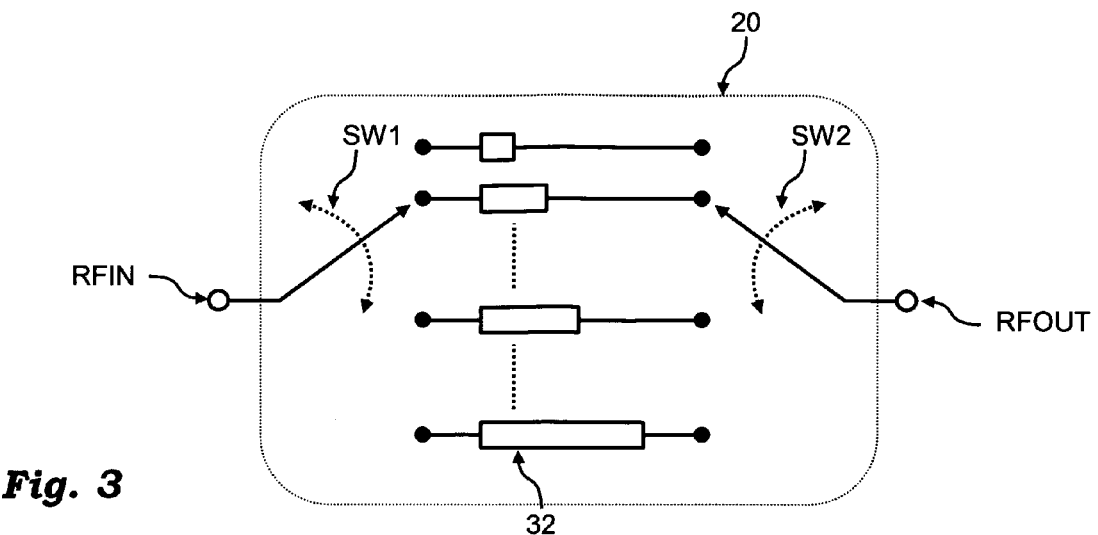

FIG. 3 schematically shows a RF phase shifter; and

Figure 4:
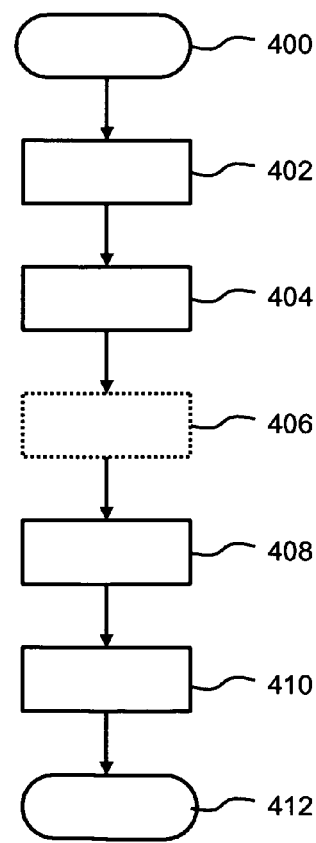

FIG. 4 is a flow chart showing a procedure for selecting the optimal phase shifts.

DETAILED DESCRIPTION OF PREFERRED EMBODIMENTS OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

More to the point, while reference will be made throughout this description primarily to HSPA AP (Access Point), those of skill in the art will appreciate that no specific limitations are made to the HSDPA communication standard or UMTS at all. In fact, the antenna diversity mechanisms disclosed herein may be used in any communication scenario where a set of radio quality indicators (KPI) representative of the quality of the radio links between said base station and the plurality of user equipments is available.

Figure 1:
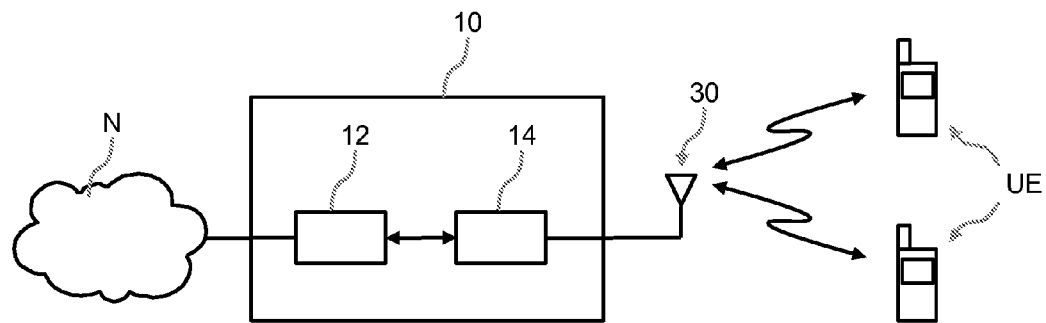
FIG. 1 illustrates a typical femtocell scenario, which had already been discussed in the foregoing.
Figure 2:
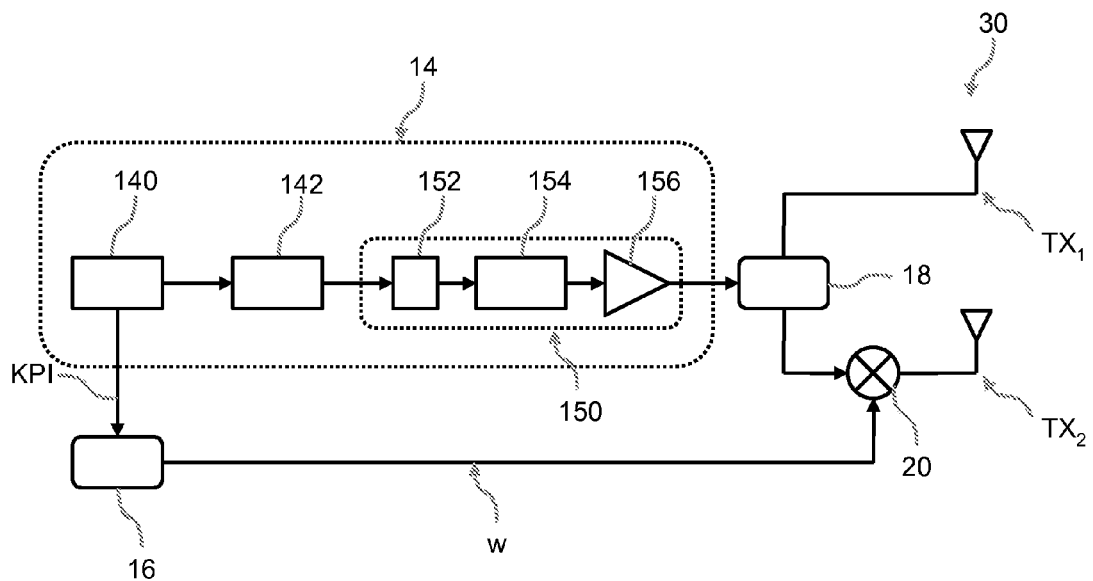
FIG. 2 is a block diagram showing a femtocell incorporating the proposed diversity mechanism.

FIG. 2 shows a possible embodiment of a femtocell incorporating a diversity mechanism.

In an embodiment, such a femtocell includes a typical prior-art UMTS/HSPA transmitter 14. Those skilled in the art will appreciate that such a transmitter 14 typically comprises a UMTS/HSPA physical Layer (Layer 1) module 142, which provides the data to be transmitted to the user equipments UE.

In conventional arrangements, data is usually transmitted via a single transmission chain 150 comprising a digital to analog (D/A) converter 152, a baseband to RF converter 154 and a power amplifier 156.

In case of HSPA AP, the communication module 14 may comprise also a hardware and/or software module 140, such as a Radio Network Controller (RNC), which implements also layer 2 and layer 3 functions such as radio resource management, security and mobility management functions.

According to this disclosure, the RF signal produced by the power amplifier 156 is separated by an RF splitter 18 into a plurality of RF signals, which are subjected to respective phase shifts prior to transmission via a plurality of transmission antennas 30.

In the exemplary embodiment shown in FIG. 2, two transmission antennas $TX_1$ and $TX_2$ are provided and only the RF signal of the second transmission antenna $TX_2$ is subjected to a phase shift defined by the coefficient $w=e^{j\alpha}$ at phase shifter 20.

In this way, the additional analog components to be introduced at RF level are only given by one RF splitter 18 and one RF phase shifter 20.

In an embodiment, the weighing factor w is controlled by a hardware and/or software module 16, which determines the value of the weighing factor w as a function of the radio link quality between the HSPA AP and the connected user equipments.

In an embodiment, both modules 140 and 16 may be implemented together in a common control module.

In an embodiment, the phase shift value w is selected by the HSPA AP in order to maximize some layer 2 and/or layer 3 Key Performance Indicators (KPI), such as the aggregate throughput of the HS-DSCH channel, the Channel Quality Indicators (CQI) provided as feedback by the different UEs or the signal to interference ratio, such as the Energy per chip to total noise ratio (Ec/No) of the Common Pilot Channel (CPICH) measured by the UEs and reported back to the HSPA access point. KPIs as considered herein may be only available in a HSPA Access Points that integrate the RNC functionalities. However, the scope of this disclosure is in no way limited to any specific selection of radio link quality indicators.

In an embodiment, the KPIs are extracted and processed by the module 16 in order to select the optimum weighting coefficient w.

In an embodiment of this disclosure, the phase shift operation is implemented by a RF multiplication with a suitable weighting factor w.

In an embodiment, the phase shift is realized by $N_D$ quantized values of phase shifts. In an embodiment, the phase shifts are implemented by propagating the RF signals through a transmission line stub of suitable length. In order to generate a set of weights, corresponding to phase shifts comprised between 0 and 360 degrees, a set of transmission line stubs with different lengths may be introduced on the signal path, with the transmission line stubs connected to the signal path by means of appropriate RF switching elements.

FIG. 3 shows a possible embodiment of the RF phase shifter 20. Specifically, the RF signal RFIN coming from the splitter 18 is sent via a RF switching element SW1 to one of a plurality of transmission line stubs 32. The signal is then subjected to a phase shift defined by the respective transmission line stub. Finally, the phase shifted RF signal RFOUT is sent to the transmission antenna 30 via a second RF switching element SW2. In the embodiment shown, both switching elements SW1 and SW2 are under the control of the module 16.

In an embodiment, the i-th transmission line stub 32 introduces on the RF signal a phase shift equal to $$\alpha = \frac{2\pi}{N_D} \cdot i \quad (1)$$

for $i=0,1,\ldots,N_D-1$, where $N_D$ is the number of values used to quantize all the possible phase shifts comprised between 0 and $2\pi(N_D-1)/N_D$ radians.

In an embodiment of the RF phase shifter 20, four or eight phase shift values (i.e. $N_D=4$ or 8) are used, which provides a good trade-off between complexity of the RF phase shifter and performance improvement.

In the following embodiments, it will be assumed that one common weight is used for all the users connected to the AP. This corresponds to the case shown in FIG. 2, with only two transmit antennas $TX_1$ and $TX_2$, wherein a phase shift w is applied only to the second RF signal. Those skilled in the art will appreciate that this exemplary embodiment may be applied to any number of transmission antennas, wherein a respective phase shift is applied to each RF signal.

In an embodiment, the module 16 selects the weight w as a function of an aggregated radio quality indicator, which represents the radio link qualities of the connected user equipments.

In an embodiment, the radio link quality experienced by the j-th user connected to the AP is determined by means of a Quality of Service (QoS) cost function $Q_{s,j}$, which depends e.g. on one or more of the KPIs such as for example MAC HS-DSCH throughput (THR), the signal to interference ratio Ec/No of the CPICH channel and CQI of the considered user:

$$Q_{s,j} = f(THR_j, CQI_j, CPICH\_Ec\_No_j) \qquad (2)$$

Exemplary choices of the function $Q_{sj}$ may be e.g.:
making $Q_{sj} = CQI_j$,
the throughput at RLC/MAC layer (see equation 6 below), or
any combination of these indicators.

The radio link qualities of the connected user equipments may in turn depend on the selected weight w.

In case of a single user connected to the HSPA AP, the optimum weight $w_{opt}$ may be selected e.g. as the one that maximizes the cost function $Q_{s,1}$ $$w_{opt} = \max_w (Q_{s,1}) \qquad (3)$$

Therefore, in case of a single user connected to the HSPA access point, the performance improvements are comparable to the performance of the CLTD technique, but with a significant lower complexity because only one power amplifier is required.

In case of multiple users connected to the HSPA AP, the performance improvement may be lower in comparison with the CLTD technique. However, the arrangement described herein has a reduced complexity and consequently lower costs compared to the CLTD technique.

In this case, the weight w may be selected according to different strategies by optimizing an aggregated radio quality function $Q_s$:

$$w_{opt} = \max_w (Q_s) \qquad (4)$$

In an embodiment, the weight w is selected which maximizes the sum of the cost functions of the M users connected to the AP:

$$Q_S = Q_{s,1} + Q_{s,2} + \ldots + Q_{s,M} \qquad (5)$$
$$w_{opt} = \max_w (Q_{s,1} + Q_{s,2} + \ldots + Q_{s,M})$$

This is particularly suitable for femtocells, because in a typical home environment only a limited number of users will expectedly be connected to the femtocell: for instance, the maximum number of users supported by a femtocell may be limited to e.g. 4 users.

In an embodiment, the cost function for a single user is equal to the throughput at RLC/MAC layer $$Q_{s,j} = THR_j \qquad (6)$$

and the optimal weight $w_{opt}$ is selected according to condition (5) as the weight w, which maximizes the aggregate throughput provided by the HSPA AP at RLC/MAC layer.

In an embodiment, the weight $w_{opt}$ is selected which maximizes the cost function of the user that experiences the minimum QoS:

$$Q_S = \min(Q_{s,1}, Q_{s,2}, \ldots, Q_{s,M}) \qquad (7)$$
$$w_{opt} = \max_w \{\min(Q_{s,1}, Q_{s,2}, \ldots, Q_{s,M})\}$$

In an embodiment, the condition given by the equation (4) is realized by testing all the possible values of the weight w.

Specifically, in the case of equation (7), there is one user for each value of w that experiences a minimum of the cost function $Q_{s,j}$ with respect to the other users (i.e. $Q_{s,j} \leq Q_{s,k}$ for k=1, ..., M and k≠j), wherein the user with index j may be different for different values of w.

In an embodiment, the value of w is selected which maximizes the cost function considering only the users with the minimum cost function $Q_{s,j}$ over all the possible values of w.

The condition given by the equation (7) provides relevant benefits in some particular user scenarios, such as one user near to the AP with Line Of Sight (LOS) propagation and a second user far from the AP in No Line Of Sight (NLOS) condition. The performance of the user near to the AP usually is only marginally influenced by the value of the weight w, because its received signal level is very high and well above the level of interference. Conversely, a user far from the AP may have a significant benefit from the optimization of the weight w, because its received signal may be low and corrupted by the interference.

In an embodiment, the module 16 may change the aggregated radio quality function $Q_s$ as a function of the values of the radio link quality indicators of the individual users. For example, the module 16 may operate on equation (5) by default and select equation (7) if a user experiences very unfavorable communication conditions.

In an embodiment, different weights w are applied for different users active in different TTI. Such an embodiment allows approaching the performance of the CLTD technique even in the case of multiple users simultaneously connected to the HSPA AP.

In an embodiment, a particular scheduling policy is used when different weights are applied to the different users: the scheduler is modified in order to schedule different users in different TTIs, which means that code multiplexing between users in the same TTI is not allowed. In addition, the change of the weight w is performed synchronously at the beginning of the TTI interval.

With these two modifications, transmission of the data to different users occurs in different TTIs, which makes it possible to select the weight that maximizes the cost function of each user $Q_{s,j}$ separately:

$$w_{opt,j} = \max_{w}(Q_{s,j}) \quad (8)$$

where $w_{opt,j}$ is the weight that is applied in correspondence of the TTI assigned to the j-th user by the scheduling algorithm.

In an embodiment, the mechanisms described in the foregoing are combined.

FIG. 4 shows in that respect a possible embodiment of such a combined mechanism.

Specifically, after a start step 400, the currently connected users are distributed trough a scheduling mechanism among the different TTIs at step 402. Those skilled in the art will appreciate that no specific limitations are made to any specific scheduling mechanism.

For example, in an embodiment, dedicated TTIs are assigned to users, which request high data rates and a common TTI is used for the other users.

In an embodiment, a scheduling mechanism is used which optimizes the distribution of the users among the TTI as a function of the knowledge of the weights w which optimize the communication with each individual user. For example, the user terminals (UEs) may be divided into groups for which the same weight w results in an improvement of the radio link quality.

Subsequently, the radio link quality indicator KPI are determined and the cost functions $Q_{s,j}$ are calculated at a step 404 for the users in the same TTI.

In an embodiment, the aggregated radio quality function $Q_s$ is selected at a step 406 as a function of the number of users of the same TTI and/or the actual values of the radio link indicator functions $Q_{s,j}$. Each TTI may have in this case a separate aggregated cost function and the function used for generating (step 408) the aggregated radio quality indicator may selectively vary over time. For example, in case a TTI contains only a single user the weight w may be selected, which optimizes the individual cost function of the user (as shown e.g. in equation (3)). Conversely, if the TTI contains several users, the mechanism shown with respect to equation (5) or (7) may be used.

Subsequently, the aggregated radio quality function $Q_s$ is generated at the step 408 and the weight w is selected at a step 410, which optimizes the aggregated radio quality function $Q_s$.

Finally, the procedure terminates at a step 412.

In an embodiment, candidate values are used for the phase shift w and the value is used which optimizes the aggregated radio quality indicator.

In an embodiment, a set of cost functions are determined for the users of the same TTI, one for each possible value of the weight w, and the weight $w_{opt}$ is selected, which optimizes the aggregated quality function.

For example, the set of cost functions may be determined at the moment a user connects to the base station. In an embodiment, the set of cost functions is also updated periodically in order to track modifications of the channel conditions.

In an embodiment, the aggregated quality function is determined for a given weight w and different weights w are verified periodically, and a new weight is selected if performance improves.

Especially, in the case of HSDPA the feedback of the CQI and the ARQ mechanism may be used advantageously. For example, a different weight w may be selected for each TTI assigned to the same user and the feedback of the CQI may be used to calculate the radio link quality of the user for the specific weight w. However, data may be lost due to the selection of an alternative weight, because the communication link quality may decrease. In this case, the ARQ mechanism may be used to automatically request such packets.

The embodiments described in the foregoing are particularly suitable for use in femtocells, such as HSPA AP.

The same mechanism may be notionally used also in conventional base station scenarios. However, certain radio link quality indicators, such as the throughput at the output of the RLC level, may be available only at the RNC, and the RNC typically does not form part of a conventional base station. As a result an unacceptably long delay may be introduced before the throughput indicators are available for selecting the optimized weight $w_{opt}$. Also, a significant amount of users may be connected to a conventional base station and this would make it practically unfeasible to determine a meaningful optimized weight $w_{opt}$ for all users.

By way of contrast, only a limited number of users will be expectedly connected to the same femtocell in a home scenario, and both the scheduling and the weight selection mechanism may thus operate very well to provide a significant improvement of communication quality in interference and noise limited environments. In fact, the arrangement disclosed herein achieves performance comparable to CLTD, with significant lower costs, which is particularly important for mass products, such as low cost HSPA AP.

Consequently, without prejudice to the underlying principles of the invention, the details and the embodiments may vary, even appreciably, with respect to what has been described by way of example only, without departing from the scope of the invention as defined by the annexed claims.

The invention claimed is:

1. A method of transmitting signals from a femtocell towards a plurality of user terminals in a cellular communication system, comprising:
   generating a plurality of diversity radiofrequency (RF) signals,
   subjecting at least one of said diversity RF signals to a selectively variable RF phase shift,
   determining at said femtocell a set of radio link quality indicators each representative of the quality of the radio link between said femtocell and a respective one of said plurality of user terminals,
   generating, at said femtocell, an aggregated radio quality indicator from said set of radio link quality indicators, and
   selectively varying said variable RF phase shift as a function of said aggregated radio quality indicator, wherein selectively varying said variable RF phase shift as a function of said aggregated radio quality indicator includes selecting the RF phase shift which optimizes said aggregated radio quality indicator.

2. The method of claim 1, further including:
   generating plural candidate values for said variable RF phase shift, and
   selecting a value of said plural candidate values which optimizes said aggregated radio quality indicator.

3. The method of claim 1, wherein said set of radio link quality indicators includes a data throughput between said femtocell and each user terminal, and wherein said aggregated radio quality indicator is a function of an aggregated data throughput.

4. The method of claim 1, wherein said aggregated radio quality indicator is a function of the set of radio link quality indicators of the user terminals which experience the worst channel conditions.

5. The method of claim 1 further including the step of selectively varying over time the function used for generating said aggregated radio quality indicator from said set of radio link quality indicators.

6. The method of claim 1 further including:
scheduling a transmission from said femtocell towards said plurality of user terminals in time slots, and
determining for each time slot a respective value for said variable RF phase shift.

7. The method of claim 6, wherein said scheduling the transmission from said femtocell towards said plurality of user terminals in time slots is performed as a function of data throughput requested by said plurality of user terminals.

8. The method of claim 6, wherein said scheduling the transmission from said femtocell towards said plurality of user terminals in time slots is performed as a function of the phase shifts which optimize the radio link quality between the femtocell and sub sets of said plurality of user terminals.

9. The method of claim 6, wherein the transmission from said femtocell to said plurality of user terminals is a High Speed Downlink Packet Access transmission and wherein said set of radio link quality indicators includes Channel Quality Indicators for said High Speed Downlink Packet Access transmission.

10. A femtocell for a communication system for transmitting RF signals towards a plurality of user terminals, the femtocell comprising:
at least one radiofrequency (RF) splitter for generating a plurality of diversity RF signals,
at least one RF phase shifter to apply to at least one of said diversity RF signals a selectively variable RF phase shift, and
a hardware controller for generating control signals for said at least one RF phase shifter to selectively vary said RF phase shift, said hardware controller being configured for performing steps of:
determining at said femtocell a set of radio link quality indicators each representative of the quality of the radio link between said femtocell and a respective one of said plurality of user terminals,
generating, at said femtocell, an aggregated radio quality indicator from said set of radio link quality indicators, and
selectively varying said variable RF phase shift as a function of said aggregated radio quality indicator, wherein selectively varying said variable RF phase shift as a function of said aggregated radio quality indicator includes selecting the RF phase shift which optimizes said aggregated radio quality indicator.

11. The femtocell of claim 10, wherein said hardware controller comprises a Radio Network Controller.

12. The femtocell of claim 10, wherein said femtocell is a High Speed Packet Access (HSPA) access point.

13. A non-transitory computer readable media having software code portions stored thereon that, when executed by a computer, perform the steps of:
generating a plurality of diversity radiofrequency (RF) signals,
subjecting at least one of said diversity RF signals to a selectively variable RF phase shift,
determining at a femtocell a set of radio link quality indicators each representative of the quality of the radio link between said femtocell and a respective one of a plurality of user terminals,
generating, at said femtocell, an aggregated radio quality indicator from said set of radio link quality indicators, and
selectively varying said variable RF phase shift as a function of said aggregated radio quality indicator, wherein selectively varying said variable RF phase shift as a function of said aggregated radio quality indicator includes selecting the RF phase shift which optimizes said aggregated radio quality indicator.

14. A femtocell for a communication system for transmitting RF signals towards a plurality of user terminals, the femtocell comprising:
at least one radiofrequency (RF) splitter for generating a plurality of diversity RF signals,
at least one RF phase shifter to apply to at least one of said diversity RF signals a selectively variable RF phase shift, and
a processor, and
a memory for storing software, which when executed by the processor, causes the femtocell to generate control signals for said at least one RF phase shifter to selectively vary said RF phase shift, and perform steps of:
determining at said femtocell a set of radio link quality indicators each representative of the quality of the radio link between said femtocell and a respective one of said plurality of user terminals,
generating, at said femtocell, an aggregated radio quality indicator from said set of radio link quality indicators, and
selectively varying said variable RF phase shift as a function of said aggregated radio quality indicator, wherein selectively varying said variable RF phase shift as a function of said aggregated radio quality indicator includes selecting the RF phase shift which optimizes said aggregated radio quality indicator.

* * * * *